Patented Aug. 7, 1945

2,381,820

UNITED STATES PATENT OFFICE 2,381,820

CONVERSION OF HYDROCARBON OILS

Aristid V. Grosse and William J. Mattox, Chicago, Ill., assignors to Universal Oil Products Company, Chicago, Ill., a corporation of Delaware No Drawing. Application August 18, 1939, Serial No. 290,847

2 Claims. (Cl. 196—52)

This invention relates to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function selectively to promote the formation of substantially unsaturated, low boiling gasoline fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, the knowledge of what catalysts to employ when cracking different fractions from different petroleums is largely empirical and admits of no generalizations. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst and in general it may be said that very few, if any, catalysts which have been tried thus far in cracking reactions have reached a commercial status. The present invention is concerned with the use of catalytic materials which are specially adapted to accelerate the cracking of heavy fractions of petroleum and other hydrocarbonaceous materials to increase the rate of production of gasoline-boiling range fractions. The preferred catalysts are characterized by selectivity in accelerating gasoline-forming reactions rather than gas-forming reactions, by their refractory character which enables them to retain their catalytic properties through many repeated periods of use and reactivation under severe conditions of temperature, and by their ease and simplicity of manufacture and their exact reproducibility.

In one specific embodiment the present invention comprises a process for producing gasoline by subjecting higher boiling hydrocarbon oils at a temperature in the approximate range of 500–700° C. to contact with a granular catalytic material comprising a mass formed by calcining an alkali metal-free composite of a major proportion of precipitated silica hydrogel and a minor amount of precipitated chromium hydroxide hydrogel.

In the following specification the terms "silica" and "chromia" are used in a broad sense. The chromia is used in referring to chromium sesquioxide or a hydrated chromium hydroxide which forms chromium sesquioxide on calcination. Inasmuch as the chemical knowledge of the solid state has not been developed perfectly, it is not possible to give the structure of all solid substances. All that can be said definitely concerning these masses is that they contain silicon, oxygen, and chromium. Generally speaking, however, the oxides mentioned show more or less low catalytic activity individually but in the aggregate display high activity. This activity is not an additive function, it being relatively constant for a wide range of proportions of the components, whether in molecular or fractions of molecular proportions. Neither component can be determined as the one component for which the other may be considered as the promoter according to conventional terminology, nor can one component be determined as the support and the other the catalyst proper.

According to the description of the preparation of the preferred catalysts given below, precipitated chromia hydrogel is composited with silica hydrogel and then the composite is washed, dried, formed into particles, and calcined; or the composite may be washed, formed into particles, dried, and then calcined to produce a catalytic mass. However, the different catalysts which may be so produced may not necessarily give equivalent results in service.

According to the present invention the heavier distillate fractions of petroleum are cracked at a temperature in the order of 500–700° C., and at substantially atmospheric pressure, or at an increased pressure, while in contact with catalysts produced preferably by precipitating chromia hydrogel upon a relatively pure salt-free silica hydrogel, followed by washing to remove water soluble salts and then drying to remove a major portion of the combined or adsorbed water. A superatmospheric pressure up to approximately 70 atmospheres may also be employed for the cracking of such hydrocarbon distillates.

The finished catalysts prepared as indicated above, may contain approximately 2-35%, by weight of chromia, although as a rule preferred compositions for these catalysts based upon yields and quality of gasoline are in the range of 4-10% chromia. These proportions will vary considerably with the particular hydrocarbon fractions subjected to catalytic cracking and with the degree of conversion desired in any particular case.

It is to be recognized that very little is known positively concerning the mechanism of enhanced activity of complex catalysts and no attempt will be made herein to offer any definite reasons for the observed mutually promotional effects of silica and chromia composites prepared for catalytic cracking purposes according to the present invention. There may be a catalytic effect due to the compositing of the catalyst components and it may be that the chromia is the more active catalyst and is dispersed extensively in and on the silica in order to present a large surface.

In manufacturing the preferred catalysts in accordance with the present process it is necessary to employ silica which has been prepared by precipitation from solution as a hydrogel within or upon which the chromia is deposited also by precipitation as a hydrogel. The most convenient and ordinary method of preparation of a satisfactory silica gel is to acidify an aqueous solution of sodium silicate by the addition of the required amount of hydrochloric acid. The excess of acid and the concentration of the solution in which the precipitation is brought about will determine the eventual primary activity of the silica and its suitability for compositing with the chromia hydrogel to produce a catalyst of high activity. In general, the most active silica is produced by adding only enough acid to cause gel formation to occur in the sodium silicate, but the material formed at such a point is rather gelatinous and is filtered with difficulty. Further, the silica hydrogel is coagulated incompletely at this point. By adding a moderate excess of acid after the hydrogel has formed, the desirable physical characteristics in regard to catalyst activity are conserved while the material is made more suitable for filtration and the silica hydrogel is precipitated more completely. Fairly good hydrated silica for present catalytic purposes may be made by employing as high as 20% excess hydrochloric acid by the addition of more acid, but beyond this point a part of the more desirable properties is lost. After precipitating the silica gel it is preferably washed until substantially free from salts by using several alternative reagents, which will be described later.

In one mode of preparing the activated form, the silica hydrogel may be boiled either with separately precipitated chromia, which is added in the wet condition to the silica suspension, or the silica hydrogel may be suspended in and boiled with a solution of a chromium salt such as, for example, an aqueous solution of chromium nitrate. In either case the final precipitate comprising essentially the hydrogels of silica and chromia is finally washed to substantially complete removal of water soluble materials, and dried at about 100-125° C. for 2-6 hours to produce a rather crumbly and granular material containing approximately 15-30% moisture, which may be ground and pelleted or sized to produce particles of catalysts. Alternatively, the washed composite of silica and chromia hydrogels may be formed into particles, then dried and calcined to produce the active catalyst. For this calcination a temperature is employed in the approximate range of 500-1000° C. The temperature of calcination has a profound influence upon the properties of the finished catalyst. Use of a temperature in the lower portion of the range indicated results in the formation of a catalyst with strong dehydrogenating activity, while the employment of a temperature of approximately 1000° C. produces a catalyst of lower dehydrogenating activity, but with high cracking activity for producing a highly olefinic gasoline.

The necessary chromia hydrogel is deposited preferably in or on washed alkali metal-free silica gel by adding an alkaline precipitant such as ammonium hydroxide, ammonium carbonate, or ammonium sulfide to an aqueous solution of a chromium compound in which previously prepared and washed silica gel is suspended, followed by washing of the total composite precipitate.

As a further alternative method of producing the desired catalyst, a solution of a chromium salt may be added to a solution of an alkali metal silicate to jointly precipitate silica hydrogel with chromia hydrogel and further amounts of silica hydrogel may then be precipitated by the addition of acid. A characteristic equation illustrating the preparation of a silica-chromia catalyst is given below, although in it no account is taken of water of hydration:

$3Na_2SiO_3 + 2Cr(NO_3)_3 \rightarrow$
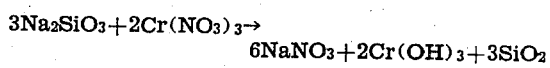
$6NaNO_3 + 2Cr(OH)_3 + 3SiO_2$

It will be obvious that the employment of the reactions shown in the above equation will be limited on account of the molal proportions involved so that such a method of preparation of a composite may need supplementing by the presence of acid for further precipitation of silica to obtain the desired ratio.

It should be emphasized in the present connection that the catalysts which characterize the process of the invention are essentially composites of substantially pure amorphous silica with amorphous chromia. Experiments have indicated that distinctly inferior catalytic materials are obtained when either the silica or chromia of the composites has crystalline characteristics. That is, it is not sufficient to precipitate chromia on such natural siliceous materials as powdered quartz or diatomaceous earth however finely divided these materials may be. Similarly, inferior catalysts result if any known forms of crystalline chromia are mixed with carefully prepared and washed amorphous silica. Silica of some value has been obtained by the hydrolysis of silicon tetrachloride, although that obtained similarly from silicon tetrafluoride was decidedly inferior.

In the preparation of active silica hydrogels from water soluble silicates, a series of experiments has further indicated that hydrochloric acid is the best common material to use as a precipitant, although sulfuric acid and other acids give but slightly inferior results. The precipitation is best conducted at approximately normal temperature since tests made at temperatures of the order of 95° C. gave silica gel which was inferior.

If alkali metal salts are present in sufficient quantities in either the original precipitated silica gel, or in the final catalyst composite, catalysts are obtained which are not sufficiently active under the usual cracking conditions. If present in smaller quantities, catalysts may be obtained which are active in the early stages of use but lose their activity during the elevated temperatures reached in regeneration by the burning off of carbonaceous deposits in a stream of air or other oxygen-containing gas. Catalysts which contain still less sodium may be heated to as high as approximately 1000° C. without loss of activity. For these reasons special washes are preferably used which are capable of removing these sodium compounds from the catalyst so that only quite minute amounts remain, since it has been found that this sodium cannot be washed out by water alone. The washes developed are dilute hydrochloric acid and ammonium chloride, which serve to displace the sodium in the catalyst so that additional water washing can remove the sodium. For economic reasons hydrochloric acid seems to be preferable to ammonium chloride and also because ammonium chloride seems to be slightly inferior in its effectiveness.

Catalysts prepared for the process by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

According to the present process catalysts prepared by the general procedure described in the preceding paragraphs are utilized to the best advantage as reactor filling materials in the form of small pellets or granules. In the majority of cases wherein hydrocarbon fractions readily vaporizable at moderate temperatures without extensive decomposition are employed, the average particle size is within the range of 6–10 mesh, which may apply either to small pellets of uniform size and short cylindrical shape or to particles of irregular size and shape produced by the grinding and sizing of the partially dehydrated materials.

While the simple method of preheating a given fraction of hydrocarbon oil vapors to a temperature suitable for their cracking in contact with the catalysts and then passing the vapors over a stationary mass of catalyst particles contained in a cylindrical chamber (preferably vertical) may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions. The catalysts may also be utilized in the form of powder which is mixed with the oil and passed through reactors under conditions of temperature, pressure, and time adequate to give substantial yields of gasoline.

After the passage of the oil vapors over the catalyst, the products may be separated into heavy residual materials unsuitable for further cracking on account of their coke-forming tendencies, intermediate insufficiently converted fractions amenable to further catalytic cracking, gasoline boiling range materials and fixed gases, the intermediate fractions being returned directly to admixture with the charging stock so that ultimately there is a complete recycling of the unconverted fractions and maximum utilization of the cracking stock for gasoline production.

As the activity of the catalyst for producing gasoline decreases with use and is highest when fresh or freshly reactivated, this invention is carried out preferably by utilizing cracking reactors in duplicate so that the cycle of operation may consist of alternate periods of cracking and of reactivation by burning off the carbonaceous deposits in an atmosphere of an oxygen-containing gas. Powdered catalyst which has become spent by use may be withdrawn from and reactivated outside of the cracking system, after which it may be returned to the cracking reactors with the oil undergoing conversion.

The present process besides being characterized by the use of novel catalysts of relatively long life is further characterized by the production of good yields of high anti-knock gasoline, with relatively low gas formation.

In the cracking of petroleum distillates of the nature of gas oil at a temperature in the range of 500–700° C. the liquid space velocity employed is adjusted to the cracking temperature used in order to produce a relatively high yield of gasoline with low formation of gas and small deposition on the catalyst of carbonaceous materials. Thus for cracking at approximately 500° C. the preferred liquid space velocity is in the range of 0.2–20; at 550–600° C., 0.5–50; and at 650° C., 20–100, the liquid velocity being the volume of oil charged hourly per volume of catalyst space in the reactor. The time a given catalyst is used before reactivation will vary with the operating conditions and rapidity of carbon deposition. This duration of the cracking period may be in the range of 0.5–20 hours, but is preferably approximately 6 hours. Catalysts having low activity because of the deposition thereon of carbonaceous materials are reactivated at the cracking temperature by treatment with air or another oxygen-containing gas. During this reactivation treatment the catalyst temperature may increase to approximately 650° C. because of the heat of combustion of the carbonaceous material. After reactivation, the catalyst has approximately the same activity for promoting cracking as when fresh.

The following examples of the preparation and use of catalysts peculiar to the present invention are given to indicate the novelty and utility in the present process, although not with the purpose of limiting the invention in exact agreement with the data introduced.

EXAMPLE 1

For use in the preparation of the preferred cracking catalyst, a silica hydrogel obtained by precipitation from sodium silicate solution with dilute hydrochloric acid was washed with distilled water, dilute amonium chloride solution, and finally with distilled water until the water wash was free from sodium compounds, as shown by test with magnesium uranyl acetate solution. The undried gel, containing 84.2% water and corresponding to 311 parts by weight of silica, was suspended in 14,000 volumes of distilled water and 142 parts by weight of chromium nitrate nona-hydrate dissolved in 400 volumes of water was added with vigorous stirring. Ammonium hydroxide (7 Normal) was then added slowly until the precipitation of chromium hydroxide hydrogel was complete and the solution was alkaline to litmus. The composite of precipitated silica and chromia hydrogels was separated by filtration, washed and dried to 20% moisture content, then ground to pass a 50 mesh screen, admixed with 7% by weight of hydrogenated cocoanut oil and formed into 3 x 3 mm. pellets by means of a pelleting machine. The pellets were dried in an oven at 200° C. for two hours, then dried further in a stream of air at 300–400° C., for two hours, next calcined at 600° C., to burn out the hydrogenated cocoanut oil, and finally calcined at a temperature of 1,000° C., for 10 hours.

The calcined pellets of the silica-chromia catalyst (containing 8% by weight of $Cr_2O_3$) were then used for filling a tube through which Pennsylvania gas oil was passed at 10 liquid space velocity and temperatures of 550 and 600° C. under atmospheric pressure. The results in Table 1 show that 16–25% by weight of gasoline was formed per pass with low formation of permanent gases. The operating conditions and nature of the products formed are shown in Table 1.

TABLE 1

*Cracking of Pennsylvania gas oil in the presence of silica-chromia catalyst*

| | | | |
|---|---|---|---|
| Temperature, ° C | 550 | 600 | 600 |
| Time on test, hours | 1 | 1 | 6 |
| Products, percent by weight of charge: | | | |
| Gasoline | 15.9 | 24.8 | 22.0 |
| Recycle stock | 78.1 | 63.6 | 67.6 |
| Gas, condensible | 1.7 | 1.8 | 1.4 |
| Uncondensible | 2.2 | 6.8 | 7.0 |
| Carbon | 0.1 | 0.2 | 0.1 |
| Loss | 2.0 | 2.8 | 1.9 |
| Analysis of condensible gas, mole percent: | | | |
| $C_2$ and lighter | 0.4 | 0.3 | |
| Propene | 39.1 | 45.6 | 59.8 |
| Propane | 10.9 | 10.2 | 18.5 |
| Isobutene | 17.7 | 14.5 | 5.7 |
| n-Butene | 25.8 | 25.0 | 12.4 |
| Butanes | 4.3 | 2.9 | 2.0 |
| $C_5+$ | | 1.5 | 1.6 |
| Analysis of uncondensible gas, mole percent: | | | |
| Hydrogen | 37.6 | 20.5 | 12.4 |
| Methane | 20.8 | 22.9 | 23.8 |
| Ethane | 14.3 | 17.4 | 20.3 |
| Ethylene | 16.8 | 23.4 | 26.3 |
| Propane | 1.8 | 1.8 | 3.1 |
| Propene | 8.1 | 9.2 | 11.6 |
| $C_4+$ | 0.6 | 4.8 | 2.5 |
| Properties of the gasoline: | | | |
| Octane number, motor method | 78.0 | 77.0 | 75.5 |
| A. P. I. gravity at 60° F | 59.2 | 59.4 | 61.0 |
| Specific gravity at 20° C | 0.738 | 0.737 | 0.727 |
| Bromine number | 146 | 133 | 135 |
| Mean molecular weight | 105 | 104 | 113 |
| Olefin content, percent | 96 | 86 | 95 |
| Engler distillation, °F.: | | | |
| I. B. P | 89 | 92 | 80 |
| 10% | 139 | 132 | 127 |
| 30% | 197 | 190 | 184 |
| 50% | 250 | 244 | 250 |
| 70% | 302 | 307 | 311 |
| 90% | 359 | 371 | 374 |
| E. P | 402 | 403 | 399 |
| Percent over | 95.0 | 97.5 | 94.0 |
| Percent bottoms | 1.5 | 1.0 | 1.0 |
| Percent loss | 3.5 | 1.5 | 5.0 |

EXAMPLE 2

Chromia-silica catalysts containing 4, 8, and 32% by weight of chromium sesquioxide were prepared from washed silica gel by the same procedure as described for preparing the catalyst used in Example 1, with additional calcination for 10 hours at 1000° C. Cracking runs of 1 hour duration were made on Pennsylvania gas oil on these catalysts in quartz tubes at 550° C. under atmospheric pressure using a liquid space velocity of 10. The results of these runs given in Table 2 show that a gasoline yield of 23.1% by volume was obtained with the catalyst containing 8% chromia in comparison with 16.3 and 17.0% by volume of gasoline produced in the presence of the catalysts containing 4 and 32% chromia, respectively.

TABLE 2

*Effect of chromia concentration on the activity of silica-chromia cracking catalyst*

| | | | |
|---|---|---|---|
| Chromium sesquioxide, per cent by weight | 4 | 8 | 32 |
| Products, per cent by weight of charge: | | | |
| Gasoline | 14.6 | 20.7 | 15.2 |
| Recycle stock | 76.8 | 64.3 | 76.8 |
| Gas, condensible | 1.1 | 4.4 | 1.4 |
| Uncondensible | 4.4 | 7.2 | 4.5 |
| Carbon | 0.4 | 0.3 | 0.4 |
| Loss | 2.7 | 3.1 | 1.6 |
| Analysis of condensible gas, mole per cent: | | | |
| $C_2$ and lighter | | | 1.7 |
| Propene (Olefins, | 55.1 | 42.9 | |
| Propane | 82.4 | 10.0 | 14.6 |
| Isobutene Paraffins, | 6.5 | 7.3 | |
| n-Butene | 19.6 | 23.7 | |
| Butanes | 16.3) | 2.1 | 5.8 |
| $C_5+$ | | 6.5 | 4.0 |
| Analysis of uncondensible gas, mole per cent: | | | |
| Hydrogen | 47.0 | 23.1 | 45.0 |
| Methane | 19.1 | 26.4 | 20.2 |
| Ethane | 12.2 | 14.6 | 12.4 |
| Ethylene | 11.5 | 25.3 | 13.2 |
| Propane | 1.8 | 1.3 | 1.8 |
| Propene | 6.2 | 7.6 | 6.4 |
| $C_4+$ | 2.2 | 1.7 | 1.0 |
| Properties of the gasoline: | | | |
| A. P. I. gravity at 60° F | 56.3 | 57.4 | 57.5 |
| Specific gravity at 20° C | 0.750 | 0.745 | 0.745 |
| Bromine number | 127 | 138 | 132 |
| Mean molecular weight | 105 | 108 | 105 |
| Olefin content, per cent | 83 | 90 | 86 |
| Engler distillation °F.: | | | |
| I. B. P | 114 | 106 | 105 |
| 10% | 170 | 162 | 150 |
| 30% | 210 | 200 | 204 |
| 50% | 268 | 257 | 261 |
| 70% | 320 | 313 | 314 |
| 90% | 365 | 374 | 363 |
| E. P | 404 | 408 | 401 |
| Per cent over | 98.5 | 96.0 | 98.5 |
| Per cent bottoms | 1.0 | 2.0 | 1.0 |
| Per cent loss | 0.5 | 2.0 | 0.5 |

EXAMPLE 3

Several cracking runs were made on Pennsylvania gas oil in the presence of 8% chromia on silica catalyst samples which had been calcined at different temperatures. These comparative results are summarized in Table 3.

TABLE 3

*Effect of catalyst calcination temperature on cracking of Pennsylvania gas oil at 550° C.*

| | | | |
|---|---|---|---|
| Calcination temperature °C | 550 | 650 | 1000 |
| Time, hours | 1 | 1 | 10 |
| Products, weight per cent of charge: | | | |
| Gasoline | 17.0 | 19.1 | 20.7 |
| Recycle stock | 71.3 | 69.2 | 64.3 |
| Gas, condensible | 3.5 | 2.1 | 4.4 |
| Uncondensible | 6.1 | 7.4 | 7.2 |
| Carbon | 0.8 | 0.6 | 0.3 |
| Loss | 1.3 | 1.3 | 3.1 |
| Hydrogen, weight per cent of charge | 0.36 | 0.24 | 0.18 |
| Weight due to carbon | 0.12 | 0.09 | 0.04 |
| Weight due to dehydrogenation | 0.24 | 0.15 | 0.14 |
| Hydrogen, milligrams by dehydrogenation per gram of gasoline | 14 | 7.7 | 6.5 |
| Olefins in gasoline, per cent | 85 | 84 | 90 |

These results show that the gasoline yields were higher and gas losses less with the catalyst calcined at 1000° C. Also, from the hydrogen formation observed it is evident that the catalyst calcined at the higher temperature had a lower dehydrogenating activity and a lower carbon forming tendency.

The character of the present invention and its novelty and utility can be seen from the preceding specification and numerical data presented, although neither section is intended to be unduly limiting in its generally broad scope.

We claim as our invention:

1. A process for producing gasoline from heavier hydrocarbon oils which comprises subjecting the heavy oil to cracking conditions in the presence of a cracking catalyst consisting essentially of a calcined mixture of a precipitated silica hydrogel and a precipitated chromia hydrogel.

2. A process for producing gasoline from heavier hydrocarbon oils which comprises subjecting the heavy oil to cracking conditions in the presence of a cracking catalyst comprising precipitated silica gel and precipitated chromia gel, said catalyst being substantially free of alumina and alkali metal compounds.

ARISTID V. GROSSE.
WILLIAM J. MATTOX.